United States Patent

Haines

[15] 3,639,029
[45] Feb. 1, 1972

[54] ONE-STEP ORTHOSCOPIC IMAGE RECONSTRUCTING TECHNIQUE FOR A HOLOGRAM CONSTRUCTED THROUGH A DISPERSIVE MEDIUM

[72] Inventor: Kenneth A. Haines, Middletown, Del.
[73] Assignee: Holotron Corporation, Del.
[22] Filed: Apr. 1, 1970
[21] Appl. No.: 24,758

Related U.S. Application Data

[63] Continuation-in-part of Ser. No. 875,768, Nov. 12, 1969, which is a continuation-in-part of Ser. No. 809,171, Mar. 21, 1969, which is a continuation-in-part of Ser. No. 730,337, May 20, 1968, abandoned, which is a continuation-in-part of Ser. No. 649,337, June 27, 1967, abandoned.

[52] U.S. Cl. ............................................................350/3.5
[51] Int. Cl. ........................................................G02b 27/00
[58] Field of Search......................................................350/3.5

[56] References Cited

OTHER PUBLICATIONS

Haines et al., Applied Optics, Vol. 7, no. 6, June 1968 pp. 1185-1189
Leith et al., Applied Optics, Vol. 5, No. 8, Aug. 1966, pp. 1303-1311

*Primary Examiner*—David Schonberg
*Assistant Examiner*—Ronald J. Stern
*Attorney*—Woodcock, Phelan & Washburn

[57] ABSTRACT

A technique for reconstructing an orthoscopic image of an object from a hologram that has been constructed of that object through a radiation dispersion medium. The technique includes reconstructing from the hologram a first order diffracted beam with a wave front conjugate to that of the dispersed object bearing wave front recorded on the hologram. The first order diffracted beam is reconstructed in a manner to form in real space an image of the dispersive medium used during the hologram construction. A phase conjugate of the dispersive medium used in the hologram construction is positioned in the reconstructed beam. An orthoscopic image of the object is thereby formed.

6 Claims, 6 Drawing Figures

ONE-STEP ORTHOSCOPIC IMAGE RECONSTRUCTING TECHNIQUE FOR A HOLOGRAM CONSTRUCTED THROUGH A DISPERSIVE MEDIUM

CROSS-REFERENCE TO RELATED APPLICATIONS

This application is a continuation-in-part of copending application Ser. No. 875,768, filed Nov. 12, 1969, which in turn is a continuation-in-part of copending application Ser. No. 809,171, filed Mar. 21, 1969, which in turn is a continuation-in-part of copending application Ser. No. 730,337, filed May 20, 1968, now abandoned, which in turn is a continuation-in-part of application Ser. No. 649,337, filed June 27, 1967, now abandoned.

BACKGROUND OF THE INVENTION

This invention relates generally to the field of holography and more specifically relates to technique for reconstructing from a hologram a replica of an information-bearing radiation wave front which has been dispersed thereacross prior to recordation on the hologram.

The invention of off-axis holography has been generally described in several articles such as by Leith and Upatnieks in the *Scientific American*, June, 1965, pages 25–35. Briefly described, the off-axis holographic technique in one form includes interfering two coherent beams of light, which are also coherent with each other. One of the beams contains in its wave front the information to be recorded. For instance, one of the beams may be modified by a physical object. The other beam serves as reference energy and thus the phase and amplitude of the information-carrying wave front are both recorded on the hologram detector. The information-carrying wave front is reconstructed from the finished hologram upon its illumination with coherent light in a beam that is physically related to the reference wave front beam used to construct the hologram. A viewer in the path of this reconstructed information-carrying wave front is able to observe an image of the original object in full three dimensions as if he were observing the object itself.

A modification of this basic off-axis holographic technique is to phase modulate the information-carrying wave front in a known manner prior to recording the wave front on the hologram. The wave front recorded and thus that reconstructed directly from the hologram is thereby "coded." A replica of the information-carrying wave front as it existed prior to being phase modulated may be recovered from the hologram during its reconstruction by modulating the reconstructed wave front in the same manner. This technique is described by Leith and Upatnieks in the *Journal of the Optical Society of America*, Vol. 56, No. 4, page 523 (April, 1966). An object modified coherent beam is passed through a dispersive medium and the dispersed wave front is recorded on the hologram. The dispersed wave front is reconstructed from the hologram and passed back through the same dispersive medium to decode the wave front.

A related holographic technique provides for reducing the maximum space-spacial frequency product recorded on a hologram. For many applications, the amount of data that is recorded in the form of a diffraction pattern upon the photosensitive hologram detector is more than that required to reconstruct therefrom a wave front with enough information therein to form an adequate image of the object. Furthermore, in many commercial applications of off-axis holography now contemplated it is highly desirable to reduce the amount of data that must be transmitted or stored, thereby reducing the time-bandwidth product of a communications transmission system and also reducing the amount of hologram area necessary to record a given amount of information. A specific technique of hologram data reduction is described by Haines and Brumm in the *Proceedings of the IEEE*, August, 1967, pages 1512–1513, and in added detail in *Applied Optics*, June, 1968, Vol. 7, No. 6, pages 1185–1189. An object information beam is dispersed prior to its striking the hologram detector for recordation thereon. The relative positions of the object to be recorded, the hologram detector and a dispersive medium therebetween define, in part, the maximum space-spatial frequency products recorded on the hologram, thereby allowing adjustments to reduce this product. Also, the size of the hologram may be made considerably smaller than the size of the dispersion medium. Upon reconstruction of the hologram, a diffracted image carrying beam is passed back through the same dispersion medium utilized during its construction, thereby to form a data reduced image of the object originally recorded. The viewing angle of the object image so reconstructed is the same as if a hologram the size of the dispersion medium and substituted therefor in relation to the object was constructed instead of the data reduced hologram. This technique is essentially one of sampling the total object information and recording the samples. Of course, something must be sacrificed by such a sampling process which results in either reduced reconstructed image resolution or increased noise in a reconstructed image. A desired balance between image resolution degradation and increased background noise may be controlled by controlling the dispersing characteristics of the data-reducing dispersion medium. As the period of phase variation across the dispersion medium increases, the resulting reconstructed image resolution and background noise are reduced. Conversely, as the period of phase variation across the dispersion medium decreases, the reconstructed image will have increased resolution accompanied by increased background noise.

When reconstructing images from such holograms according to these basic coding or data reducing techniques, an image of the dispersion medium or other modulating structure must be formed in real space in a diffracted beam. It is at this position that a dispersion medium (or a more general wave front coding phase modulating structure) used in constructing the hologram is repositioned to cancel out its original effect and thereby reconstruct a wave front corresponding to the object information-carrying wave front. In order to reconstruct a good real space image of the dispersion medium directly from the hologram, a dispersed wave front is reconstructed that is a phase conjugate of that recorded on the hologram. The result is that the reconstructed replica of the original object information carrying beam is traveling in the wrong direction which makes images formed therein appear to an observer to be pseudoscopic; that is, points of the original object scene that appeared to be a far distance are now the nearest points in the image reconstructed thereof while near points of the object scene appear to be as distant points in the reconstructed image. It is desirable in most applications to be able to reconstruct an actual replica of the object information-carrying wave front to form an orthoscopic (actual) image of the original object scene recorded.

One technique for reconstructing an orthoscopic image of the original object scene is described at page 1188 of the aforementioned article of *Applied Optics* of June, 1968. An actual replica of the object information bearing wave front is reconstructed directly from the hologram with an image of the dispersion medium transferred by conventional optics into real space. A phase conjugate of the original dispersion medium is positioned at its real space image, thereby to eliminate the effect of the dispersion medium and reconstruct a replica of the object information-carrying wave front.

This technique as well as several other techniques for obtaining an orthoscopic image of the original object scene recorded are described in a copending application Ser. No. 875,768, filed Nov. 12, 1969. Other techniques include the construction of a second hologram from which a wave front may be reconstructed that is the same as the dispersed wave front recorded on the first hologram. These prior techniques are directed primarily at reconstructing from a hologram an actual dispersed information-carrying wave front in order to form an orthoscopic object image. These techniques so developed are very useful in most applications but suffer a disadvantage in certain other applications as being rather complex and difficult to perform.

SUMMARY OF THE INVENTION

It has been discovered that it is unnecessary to reconstruct a wave front that is the same as the dispersed object information-carrying wave front originally recorded in order to obtain an orthoscopic image of the object. A wave front may be reconstructed directly from the hologram that is a phase conjugate of the dispersed object information-carrying wave front recorded thereon. A dispersion medium that is the phase conjugate of that medium used in constructing the hologram is positioned in said reconstructed wave front at a real space image of the original dispersion medium. An orthoscopic image of the original object is formed in the reconstructed beam.

A preferred type of dispersion medium for use in practicing this invention is a transparent material, such as glass or plastic, which has a uniform light transmittance thereacross, one surface of which is provided with surface undulations in order to vary the relative phase across a wave front passing therethrough. These surface undulations may be random, such as is found in ground glass, but are preferably periodically recurring. By "conjugate" modulating structures is meant to refer to two structures having phase variation functions thereacross which are substantially of opposite signs.

To better understand the present invention, reference should be had to the following detailed description of its preferred embodiments with reference to the drawings. The invention is described in its preferred form with a modulating structure of the type to reduce the amount of data holographically recorded since this appears to be the preferred application of the inventive concept herein. However, it is not intended to so limit the invention which finds applicability whenever a hologram is constructed with a modulating structure positioned between the object to be recorded and the hologram detector.

DESCRIPTION OF THE PREFERRED EMBODIMENTS

Figure 1:
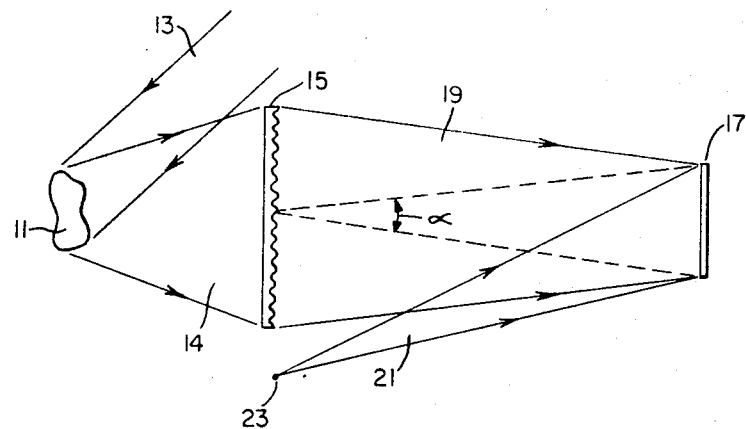
FIGS. 1 and 2 illustrate the construction and reconstruction, respectively, of a data reduced hologram.

Referring to FIG. 1, a basic technique of constructing a data reduced hologram is illustrated. An object 11 to be recorded is illuminated with a coherent light beam 13 from a convenient source such as a laser (not shown). The object reflects and diffracts this light to form an object information-carrying beam 14. A dispersion medium 15 is chosen to have an area and position relative to the object 11 to give a field of view through an area occupied by the dispersive medium that is the field of view desired of the reconstructed image. Each ray of light of the object information-carrying beam 14 is dispersed over a wide angle by the dispersive medium 15. The dispersive medium may be, for instance, a piece of ground glass which refracts a light ray an angle that is a random function of position on the dispersive medium. A preferred medium for most applications is one imparting a periodically varying phase thereacross, as discussed hereinafter.

A hologram detector 17 is positioned in a dispersed object information-carrying beam 19. A reference beam 21 which is mutually coherent with the object illuminating beam 13 is directed against the hologram detector 17 for interference with the dispersed beam 19. It is the interference pattern formed by these two intersecting beams that is recorded on the photosensitive detector 17. It will be noted that the reference beam 21 appears to originate from a substantially point source 23 which lies substantially in the plane of the dispersive medium 15. This is preferred for most applications because the angle of interference between the dispersed beam 19 and the reference beam 21 may be made very small and also because a dispersive medium is more easily positioned properly in a wave front reconstructed from the hologram. However, it is to be understood that this is not a necessary limitation in practicing the present invention.

The data recorded on the hologram detector 17 may be reduced by either positioning the detector further from the dispersive medium 15 than the dispersive medium is from the object, or by making the area of the hologram detector 17 less than the area of the dispersive medium 15, or both. What is done in any specific application depends on a number of factors including the type of data reduction that is desired. If it is desired in a particular application only to reduce the spatial frequency of the information recorded on the hologram detector 17, the distance between the detector and the dispersive medium 15 is made significantly greater than the distance between the object and the dispersive medium. Alternatively, this separation between the dispersive medium and the detector may effectively be obtained by the use of an appropriate lens placed therebetween. That part of the dispersed object information-carrying beam 19 that is recorded on the hologram detector 17 is thereby limited in range of spatial frequencies. For other applications, such as in constructing a holographic movie, it is more important that the size of the hologram detector 17 be significantly smaller than the size of the dispersive medium 15.

Factors to be considered in designing an optimum structure of the type having prismlike surface undulations for the dispersion medium 15, whether designed to impart a random or periodic phase variation across a light beam passing therethrough, are described in a copending patent application Ser. No. 809,171 filed Mar. 21, 1969, in conjunction with FIGS. 6 and 7 thereof. These factors are also described in the aforementioned *Applied Optics* article of June, 1968, pages 1185–1189.

Figure 2:
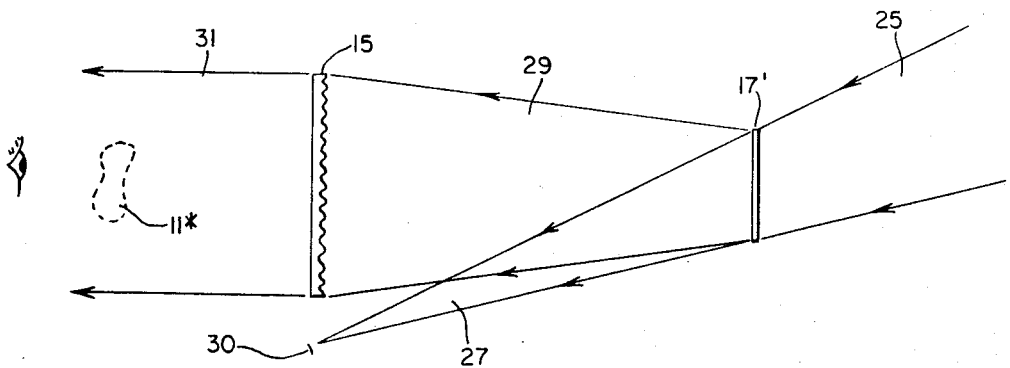

Referring to FIG. 2, a hologram 17' constructed by the technique described with respect to FIG. 1 is illuminated with coherent reconstructing light beam in a manner to reconstruct a good actual size image of the dispersion medium 15 in real space. A preferred way of reconstructing such an image is described herein. A coherent reconstructing light beam 25 illuminates an opposite side of the hologram 17' from that which was illuminated during its construction and is antiparallel with the reference beam 21 used to construct the holograms. The reconstructing light is the same wavelength as the light used to construct the hologram. Furthermore, the reconstructing light beam 25 is given a curvature opposite to that of the reference beam 21 utilized in the hologram's construction. The reconstruction light beam 25 is, therefore, a phase conjugate of the reference beam 21. The light 27 of FIG. 2 that is undiffracted by the hologram 17' is conveniently blocked by a spatial filter 30. The diffracted beam 29 is a phase conjugate of the recorded dispersed object information-carrying beam 19 of FIG. 1 and contains information of the dispersive medium 15 and the object 11. At a position in the diffracted beam 29 of FIG. 2 a distance from the hologram equal to the distance between the dispersion medium 15 and the detector 17 of FIG. 1, an image of the dispersion medium 15 comes to focus. The dispersion medium 15 is replaced coincident with its image in a manner to cancel out information of the dispersion medium to leave an object image-carrying beam 31. An image 11* is formed in the image-carrying beam 31 and may be observed by a light-sensitive means, such as a human eye, positioned in the beam 31.

The image of the dispersion medium so reconstructed in FIG. 2 is pseudoscopic, thereby having a phase function that is the conjugate of the phase function of the dispersion medium 15. This is why the effect of the dispersion medium is cancelled out upon repositioning of the original dispersion medium coincident with an image thereof. The reconstructed object informationocarrying beam 31 of FIG. 2 is the counterpart of the object information-carrying beam 14 of FIG. 1 except that they are phase conjugates of one another. Additionally, the information contained in the reconstructed beam 31 is reduced somewhat because of the sampling which results f from use of a dispersion medium. The reconstructed image 11* is pseudoscopic which is generally undesirable for three-dimensional image reconstructions. The techniques of the present invention provides for a simple way of reconstructing an orthoscopic image.

Figure 3:
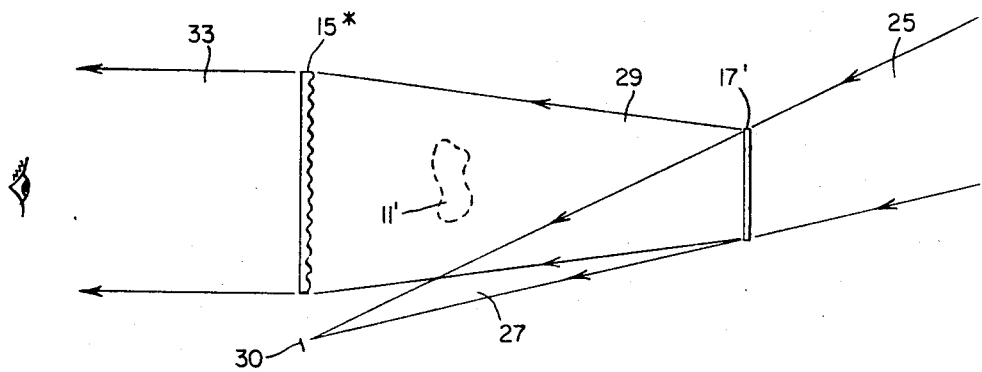
FIG. 3 illustrates a modification according to this invention wherein an orthoscopic image of an object may be viewed directly.

Referring to FIG. 3, the improvement of this invention is illustrated in one form. A hologram 17 constructed according to the techniques of FIG. 1 as discussed hereinabove is illuminated in the same way as was described with respect to FIG. 2. Those elements and light beams of FIG. 3 that are the same as those described previously are given the same reference characters. A diffracted beam 29 has an image of a dispersion medium 15 formed therein and a related dispersion medium 15* is positioned generally coincident therewith. The dispersion medium 15* is a phase conjugate of the dispersion medium 15 used in constructing the hologram 17'. The result is an image-carrying beam 33 which is an actual replica of the object information beam 14 of FIG. 1. An orthoscopic image 11' may be viewed from a position within the beam 33 of FIG. 3. The orthoscopic image 11' appears to be positioned behind the dispersion medium 15* from the observer and is an actual replica of the object 11 originally recorded on the hologram 17'. This technique works best when the angle $\alpha$ subtended by the hologram 17 of FIG. 1 at the dispersion medium 15 is small. As the angle $\alpha$ increases, the resolution of the reconstructed orthoscopic image 11' according to FIG. 3 is decreased.

Figure 4:
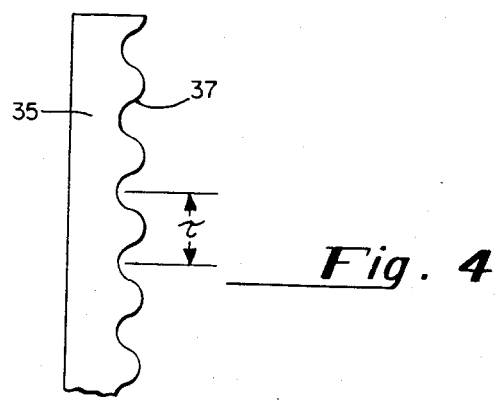
FIG. 4 is a cross-sectional view of a periodic dispersion medium for use in the present invention.

Although a dispersion medium having randomly varying relative phase characteristics across its surface may be utilized in practicing the present invention, it is preferred to use a dispersion medium having a periodically varying relative phase function thereacross. The primary advantage of a periodic varying phase structure is that it is easier to align during reconstruction with its own image when decoding a reconstructed wave front than is a random structure. An example of a periodic phase dispersion structure is shown in FIG. 4 in cross section. A transparent sheet material 35 having light refractory characteristics, such as glass or plastic, has one surface 37 thereof formed by etching or molding into a periodically varying surface having a period $\tau$. Such a surface variation may be a sinusoidal one and give good results. A more ideal surface is a parabolically varying one. The parabolic surface is ideal since light is refracted equally in all directions in a desired cone angle and, therefore, results in a better intensity distribution across a reconstructed image. Furthermore, image brightness is increased by concentrating the intensity of the refracted light into the desired cone angle.

Figure 5:
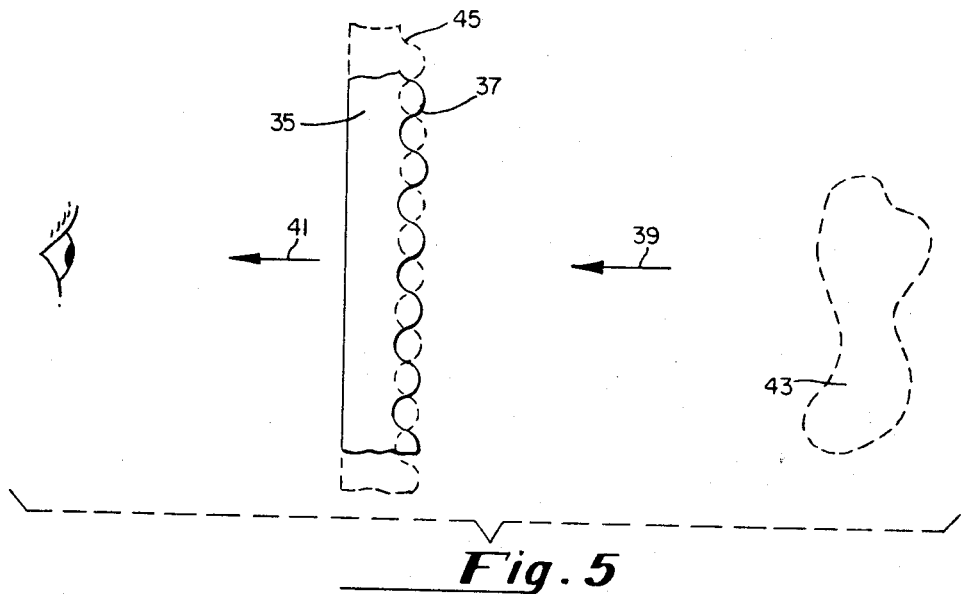
FIG. 5 shows a portion of FIG. 3 in an enlarged scale and utilizing the periodic dispersion medium of FIG. 4.

Once such a dispersion structure has been constructed, a phase conjugate thereof may be formed by taking the impression of the surface 37 of the dispersion medium according to FIG. 4. However, when a periodic relative phase varying dispersion structure 35 whose phase is inverted on alternate half-cycles is used to construct a hologram according to FIG. 1, the same dispersion medium 35 may be used in reconstructing the hologram 17 according to the techniques described with respect to FIG. 3 and still reconstruct and orthoscopic image 11'. Such a reconstruction is illustrated in FIG. 5 where it is assumed that a hologram was made of an object (not shown) through the dispersion medium 35. Reconstruction of the hologram according to the technique of FIG. 3 is partially shown in an enlarged scale in FIG. 5. A diffracted beam 39 from the hologram is incident upon the dispersive medium 35 and passes therethrough as an object image-carrying beam 41 in which an orthoscopic image 43 of the original object may be viewed by looking back through the dispersion medium 35. However, in order to reconstruct the orthoscopic image 43, the dispersive medium 35 must be positioned carefully relative to its reconstructed image 45. The dispersion medium 35 is positioned upon reconstruction with its periodic surface variations 37 displaced 180° from its image. This displacement is one-half the period of variation of the surface undulation 37 (one-half $\tau$). It is generally the same thing to say, then, that the dispersion medium having a periodic phase variation of this type thereacross must be displaced one half its surface variation relative to the hologram during reconstruction as compared with its position relative to the hologram during construction thereof. When this requirement is met, the image reconstructed is an orthoscopic one while if the dispersive medium 35 of FIG. 5 were to be placed coincident with its reconstructed image 45, the object image that is reconstructed would be pseudoscopic, as discussed hereinabove with respect to FIG. 2.

Figure 6:
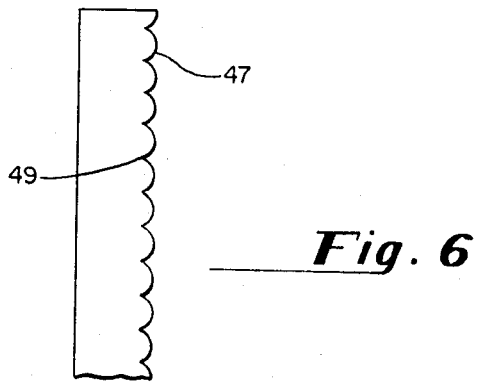
FIG. 6 is a cross-sectional view of another periodic dispersion medium for use in practicing the present invention.

Another periodic phase varying dispersion media is shown in FIG. 6 wherein its periodically varying surface 47 preferably follows a parabolic shape. The sharp change in slope in the joining of the two parabolas, such as at the point 49, is generally undesirable because of the wide angle light scattering which occurs. Therefore, such points of juncture may be made opaque with the opaque areas gradually transforming into transmitting areas in a manner to prevent unwanted light defraction by sharp changes in transmission. The dispersive medium illustrated in FIG. 6 has the advantage that less precision in alignment is required upon reconstruction than with other forms of periodic phase varying structures, such as that shown in FIG. 4.

It shall be understood that the invention is not limited to the specific arrangements shown, and that changes in modification may be made within the scope of the appended claims.

What is claimed is:

1. A method of recording and reconstructing a coherent information-bearing radiation wave front comprising the steps of:

dispersing said information-bearing radiation wave front according to a given relative phase varying function thereacross, recording as a hologram the dispersed information-bearing radiation wave front at a hologram-detecting surface positioned in the path of said dispersed wave front, reconstructing from said hologram a phase conjugate of said dispersed information-bearing radiation wave front, and dispersing said reconstructed conjugate wave front according to a relative phase varying function thereacross that is a phase conjugate of said given relative phase varying function that is used to disperse the information-bearing radiation wave front in constructing the holograms.

2. The method as defined in claim 1 wherein said information-bearing radiation wave front is derived from a physical object by illumination thereof with a monochromatic spatially coherent radiation beam, whereby an orthoscopic image of the object is reconstructed from said hologram.

3. The method as defined in claim 1 wherein the step of recording the hologram includes directing at said hologram-detecting surface a reference radiation wave front mutually coherent with the information-bearing radiation wave front, said wave fronts intersecting with a finite angle therebetween and both directed against said detecting surface at one side thereof.

4. The method as defined in claim 3 wherein the step of reconstructing the hologram includes illuminating with monochromatic spatially coherent radiation a side of the detecting surface opposite to that side against which the information-bearing and reference wave fronts are directed, said reconstructing radiation wave front directed against the detecting surface in a direction antiparallel with the direction of the reference wave front and having an opposite curvature thereto.

5. The method as defined in claim 1 wherein the step of dispersing the information-bearing radiation beam comprises positioning therein a phase-modulating structure having thereacross a periodically varying relative phase characteristic.

6. The method as defined in claim 5 wherein the step of dispersing the reconstructed conjugate wave front includes repositioning said phase modulating structure therein and displaced relative to the reconstructed wave front one-half said structure's period of phase variation from its position during the hologram construction.

* * * * *